Oct. 20, 1953     E. J. SVENSON     2,656,445
WELDING MACHINE AND CONTROL AND ACTUATING MECHANISM
Filed June 23, 1948     8 Sheets-Sheet 1
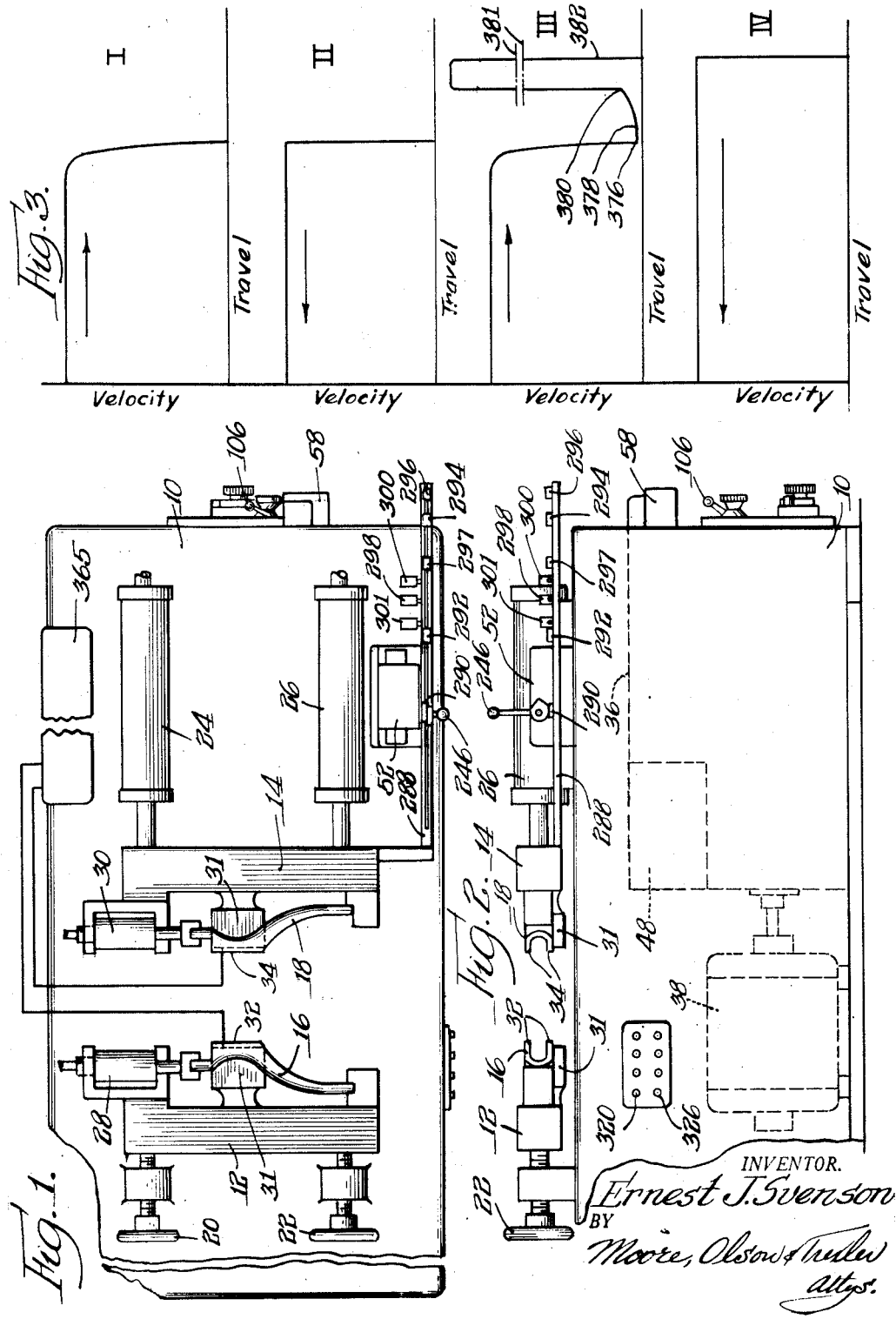

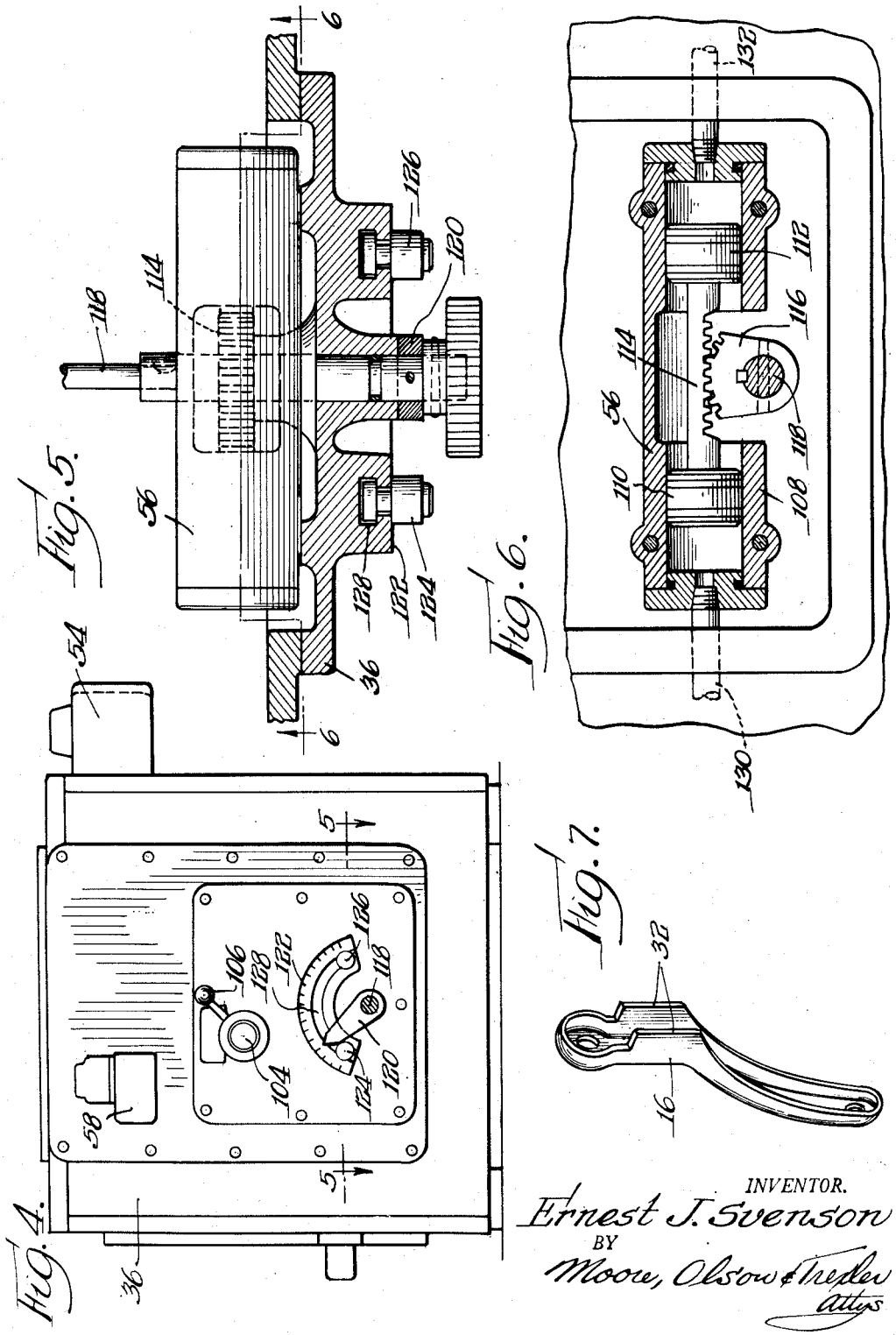

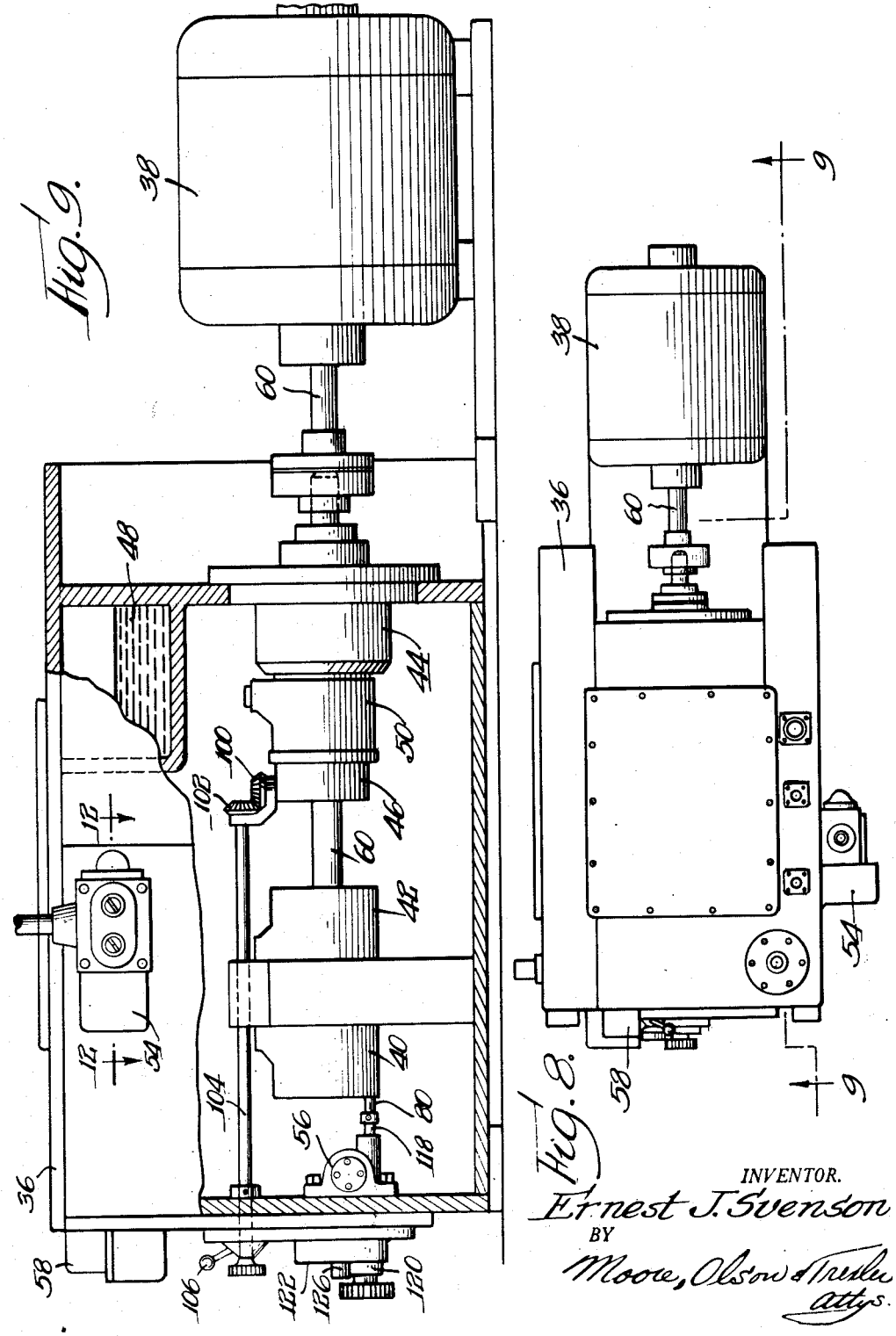

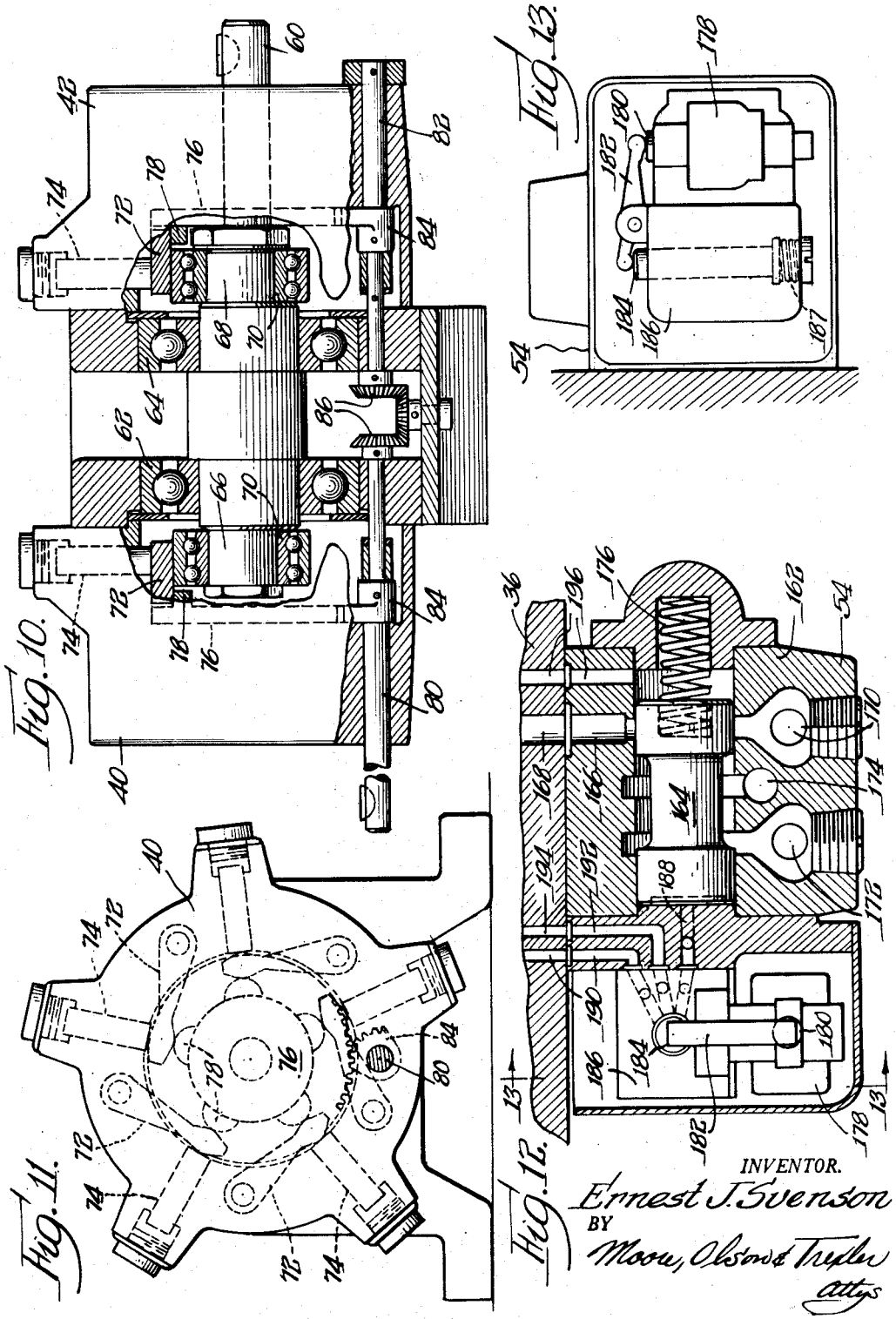

Oct. 20, 1953  E. J. SVENSON  2,656,445
WELDING MACHINE AND CONTROL AND ACTUATING MECHANISM
Filed June 23, 1948  8 Sheets-Sheet 5
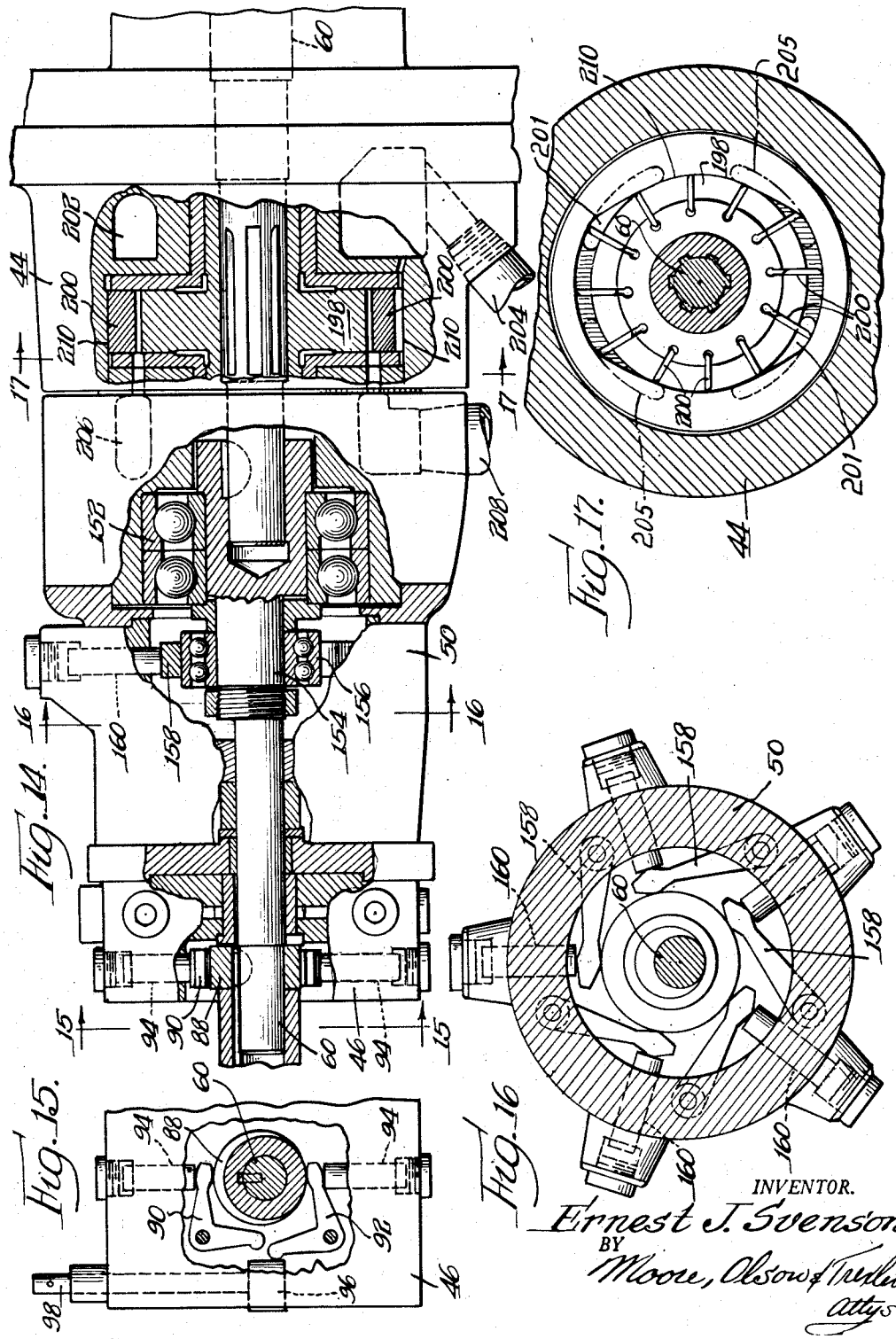
INVENTOR.
Ernest J. Svenson
BY
Moore, Olson & Trexler
Attys.

Oct. 20, 1953   E. J. SVENSON   2,656,445
WELDING MACHINE AND CONTROL AND ACTUATING MECHANISM
Filed June 23, 1948   8 Sheets-Sheet 6
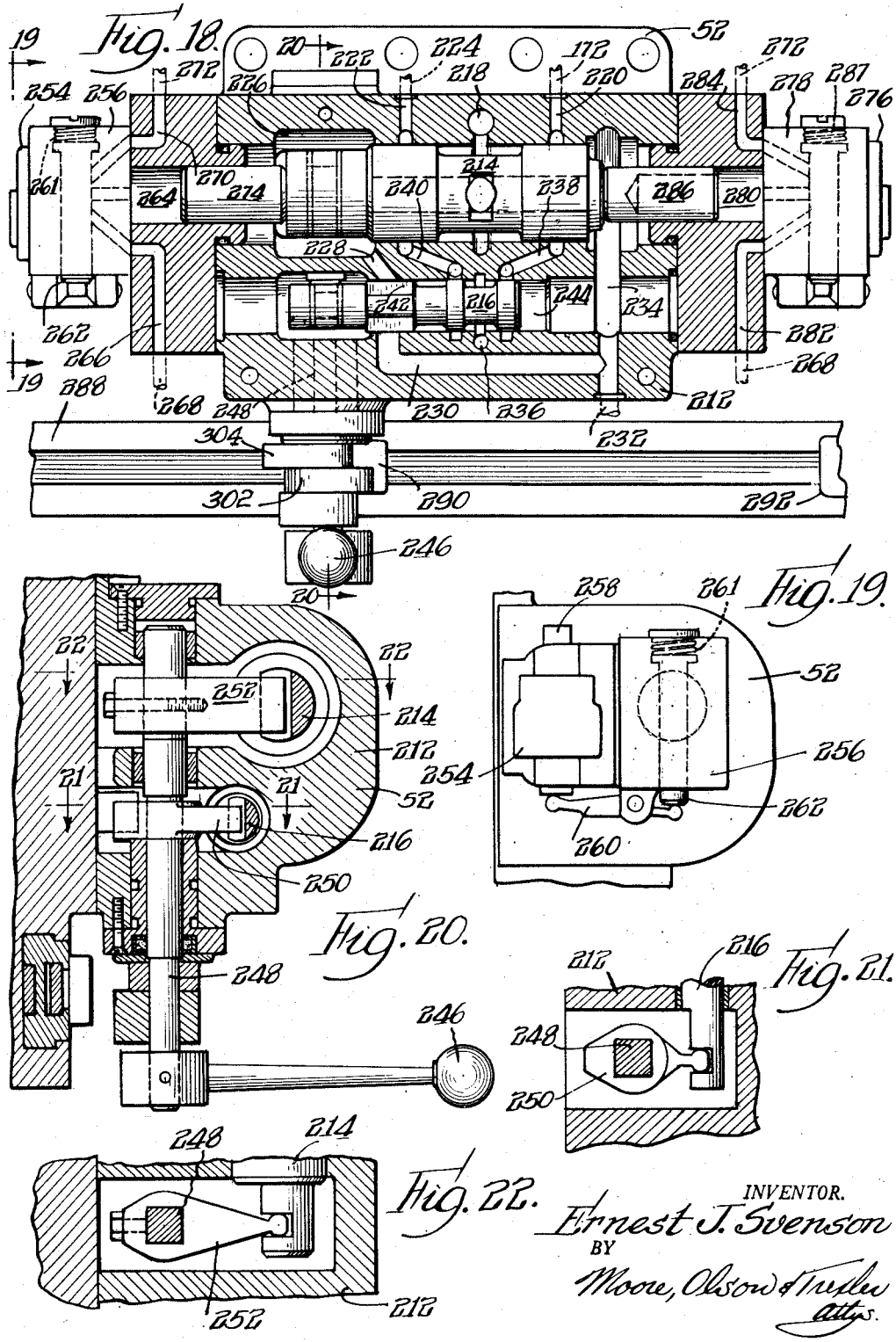

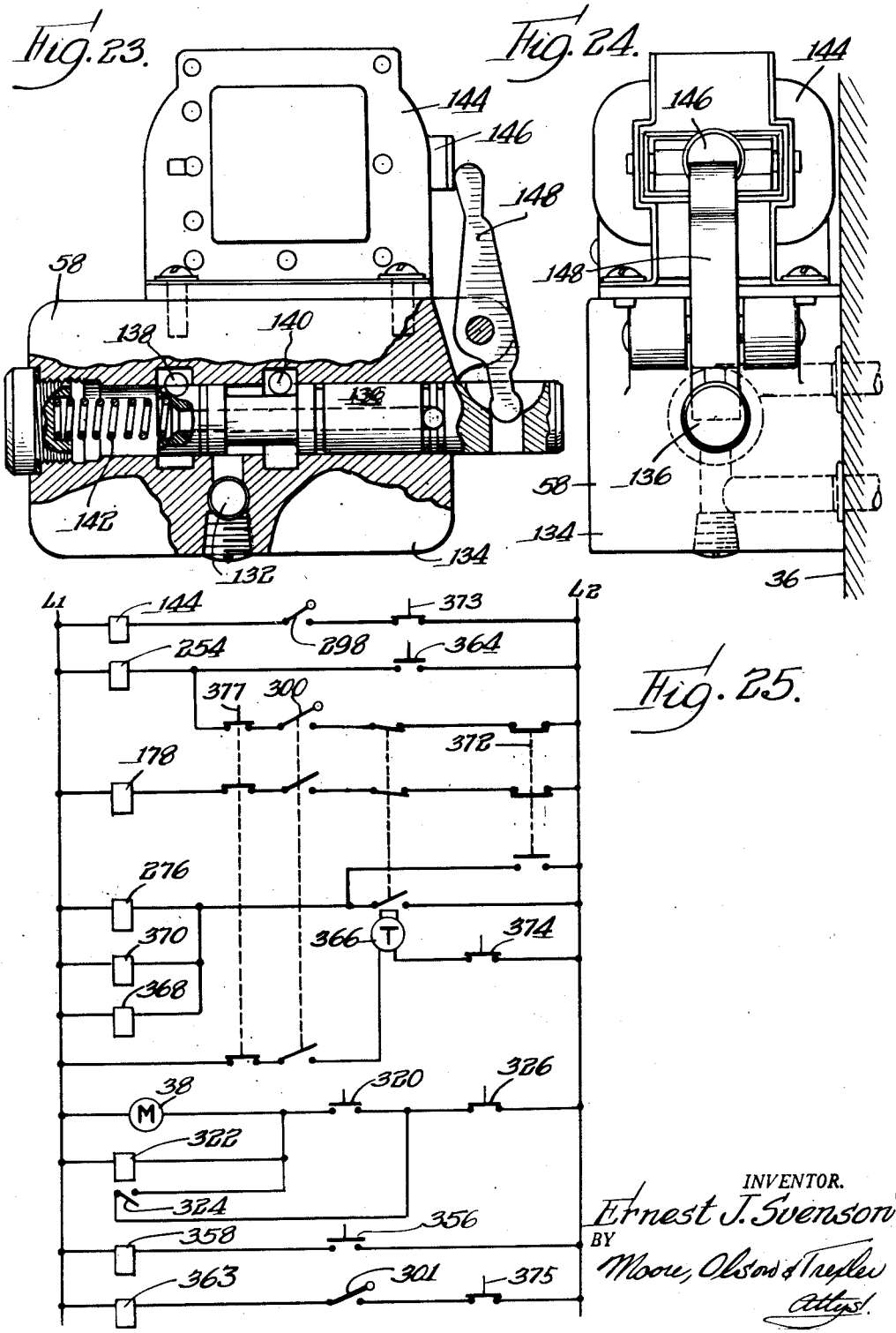

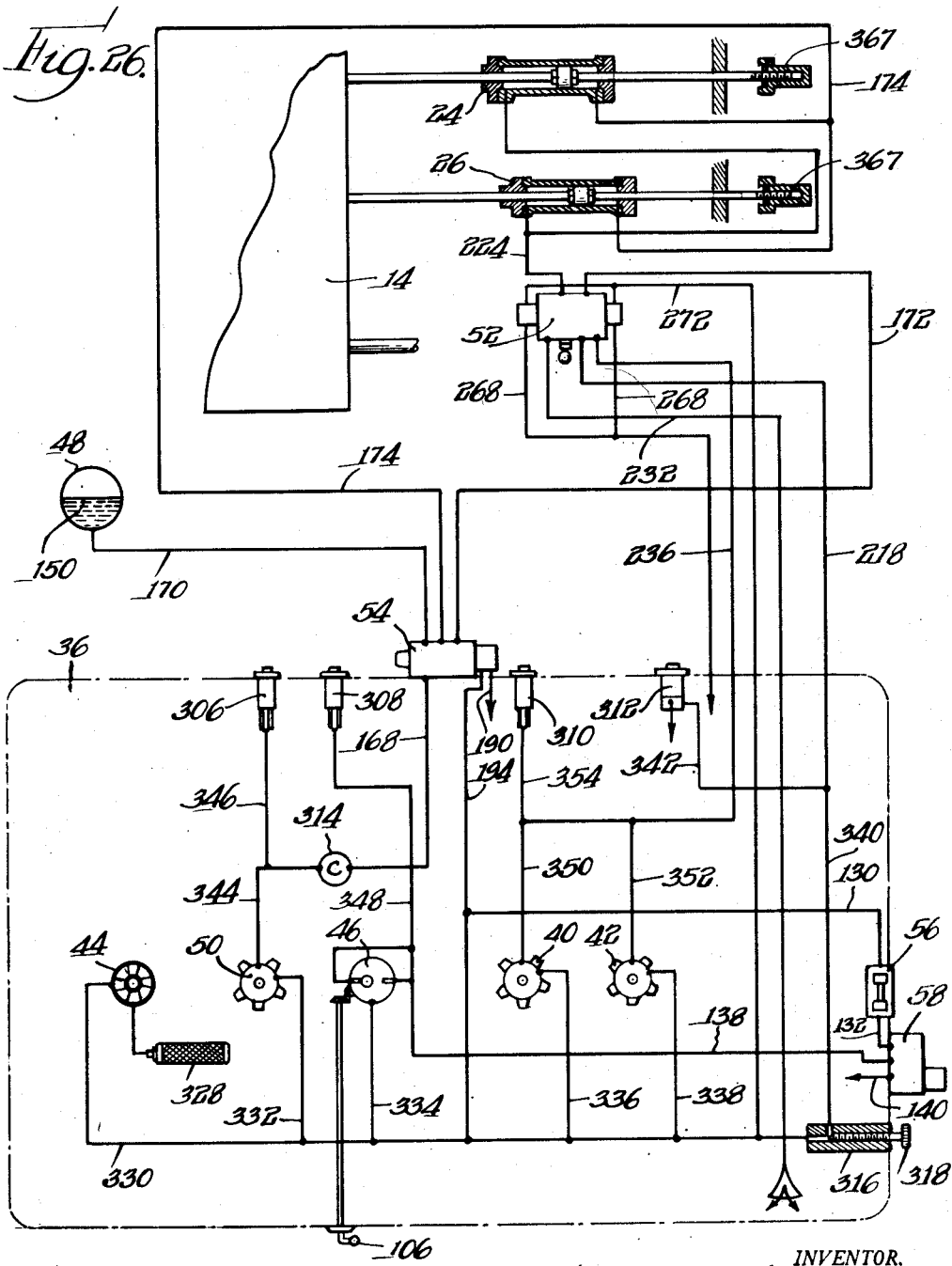

Patented Oct. 20, 1953

2,656,445

UNITED STATES PATENT OFFICE 2,656,445

WELDING MACHINE AND CONTROL AND ACTUATING MECHANISM

Ernest J. Svenson, Rockford, Ill., assignor to Odin Corporation, Chicago, Ill., a corporation of Illinois Application June 23, 1948, Serial No. 34,764

27 Claims. (Cl. 219—4)

This invention relates to welding, and concerns particularly control and actuating mechanisms for resistance welding machines.

In the operation of resistance welding machines of the type wherein the work pieces are contacted and upset welded, the work pieces are brought together with the welding potential applied between the work pieces so that as engagement occurs a flash weld is formed along the abutting work piece surfaces. As the work pieces are brought into engagement the welding operation is effected in substantially three stages. The first stage may be termed the "burning off" during which time the ragged edges or projecting metal particles along the work piece edges to be joined are liquefied and removed. This stage of the operation occurs as the work piece edges reach initial juxtaposition. The second stage of the operation may be termed the "heating" or flash stage, wherein the work pieces are brought to welding heat. This stage of the operation occurs as the juxtaposed work piece edges are brought closer together, preliminary to the final weld. The final stage of the operation is the "welding" or upsetting operation wherein the work pieces, after being brought to the proper welding heat, are jammed together with predetermined force to effect the weld.

Considerable difficulty has heretofore been encountered in securing a proper controlled movement of the work pieces, relative to each other, in connection with such welding operations; and if improper movement occurs an unsatisfactory and unpredictable weld results. For example, if the work pieces are brought together too rapidly a preliminary welding and freezing along the juxtaposed edges occurs. On the other hand, if the relative motion of the work pieces toward each other is too slow, or if the welding impact does not occur at the proper time during the "heating" stage, oxygen may penetrate the weld interfering with the flow of welding current and resulting in an improperly welded connection.

Still further, different materials to be welded, different sizes of work pieces, and other variable factors require that the control and actuating means which manipulates the work pieces as they are moved relatively together be sufficiently adjustable and controllable so that adjustments may be made to accommodate these factors of variability.

In accordance with the present invention a control and actuating mechanism for an automatic resistance welding machine of the type described is provided, which effects an accurate and predictable movement of the work pieces as they are brought into juxtaposition; which is adjustable to accommodate the factors of variability in any particular welding installation; and more specifically which brings the work pieces together during the heating stage at a progressively increasing or "arcuate" rate of travel, and with a precisely timed welding impact; whereby to insure the production of a satisfactory and predictable weld and avoid the difficulties heretofore discussed.

It is thus an object of the present invention to provide an improved control and actuating mechanism for welding machines.

More specifically stated it is an object of the invention to provide a control mechanism for resistance welding machines, of the automatically actuated type, which will effect and control the relative movements of the work pieces to be upset welded in an accurately controlled and improved manner, to effect the production of a satisfactory weld.

Still more specifically stated, it is an object of the present invention to provide an improved hydraulic control and actuating circuit for welding machines of the type defined, wherein the work pieces are brought together during the heating stage at a progressively increasing rate in an "arcuate" manner, and wherein a precisely timed welding impact is imparted, by hydraulic means, of predetermined magnitude or force.

A further object of the invention is to provide a control and actuating mechanism for welding machines of the type defined having improved adaptability and adjustability to accommodate factors of variability such, for example, as variations in work piece size, quality of material, et cetera.

Another object of the invention is to provide a control and actuating mechanism for welding machines which avoids the difficulties heretofore discussed.

Various other objects, advantages and features of the invention will be apparent from the following specification when taken in connection with the accompanying drawings, wherein a preferred embodiment is set forth for purposes of illustration.

In the drawings, wherein like reference numerals refer to like parts throughout:

Fig. 1 is a schematic plan view of a resistance welding machine constructed in accordance with and embodying the principles of the invention, in accordance with the particular embodiment selected for illustration;

Fig. 2 is a side view of the machine of Fig. 1;

Fig. 3 is a cycle diagram;

Fig. 4 is an enlarged end view of the hydraulic control unit or mechanism of the machine forming the subject matter of the present invention;

Fig. 5 is a partial sectional view, taken as indicated by the line 5—5 of Fig. 4, and more particularly illustrating a portion of the speed control mechanism forming a part of the hydraulic control unit;

Fig. 6 is a sectional view of the structure of Fig. 5 on the line 6—6 thereof;

Fig. 7 is a perspective detail of one of the work-pieces;

Fig. 8 is a plan view of the self-contained hydraulic control unit or mechanism of Fig. 4;

Fig. 9 is an enlarged sectional view of the unit (with piping and certain other parts omitted for clarity) taken along the line 9—9 of Fig. 8;

Fig. 10 is an elevational view, partly in section, of the twin feed pumps forming a part of the hydraulic unit, and employed for imparting feeding movement to the hydraulic actuators;

Fig. 11 is an end view of the feed pump unit;

Fig. 12 is a sectional detail view of the upset valve forming a part of the hydraulic control mechanism, and taken as indicated by the line 12—12 of Fig. 9;

Fig. 13 is a transverse sectional view of the upset valve on the line 13—13 of Fig. 12;

Fig. 14 is an elevational view, partly in section, of certain additional pumps included in the hydraulic control;

Fig. 15 is a sectional view on the line 15—15 of Fig. 14, more particularly illustrating the feed rate control pump, for controlling the feeding speed of the feed pumps of Fig. 10;

Fig. 16 is a sectional view on the line 16—16 of Fig. 14, more particularly illustrating the pump for charging the accumulator, forming a part of the hydraulic control;

Fig. 17 is a sectional view on the line 17—17 of Fig. 14, more particularly illustrating the traverse pump for the system;

Fig. 18 is a longitudinal sectional view of the main reversing or multiflow valve forming a part of the control structure;

Fig. 19 is an end view of the valve structure of Fig. 18, taken as indicated by the line 19—19 thereof;

Fig. 20 is a sectional view through the valve structure of Fig. 18, on the line 20—20 thereof;

Figs. 21 and 22 are detailed sectional views of the valve on the lines 21—21 and 22—22, respectively, of Fig. 20;

Fig. 23 is a sectional view through the volume control valve, also forming a part of the hydraulic control mechanism;

Fig. 24 is an end view of the valve structure of Fig. 23;

Fig. 25 is a schematic wiring diagram; and

Fig. 26 is a schematic diagram of the hydraulic control circuit.

Referring more particularly to the drawings, and first to the general structures shown in Figs. 1 and 2, it will be seen that there is illustrated a resistance welding machine comprising a main frame or base 10 upon which is mounted a plurality of work supports as indicated at 12 and 14 adapted to, respectively, carry the work pieces 16 and 18 to be welded. The work support 12 is adjustably supported upon the bed 10 by means of a pair of adjustment devices 20 and 22, but is otherwise relatively fixed or stationary upon the frame of the machine. The work support 14 is insulated and is longitudinally reciprocable upon the machine bed, being arranged for actuation by a pair of hydraulic actuators 24 and 26, the control and actuating mechanisms for which form the subject matter of the present invention. The work pieces are arranged to be carried, respectively, by the work supports 12 and 14 through the action of a pair of clamping devices 28 and 30 which may be of any suitable construction, either hydraulically or electrically actuated. The work pieces rest upon current supply plates or electrodes 31, supplied with welding current from one or more welding transformers as will be later described.

In the operation of the machine, automatically, as will hereinafter be pointed out, the work pieces are first clamped in position by the clamp structures, as illustrated in Fig. 1, whereupon the work support 14 is advanced toward the work support 12, first at a rapid traverse and then a feeding rate, and with the welding potential applied between the work pieces, so that upon engagement of the work piece surfaces 32 and 34 an upset resistance weld will be formed. The welding current is thereafter cut off, the clamp structure 30 released, and the work support 14 retracted to complete the automatic cycle.

The details of the foregoing structures form no part of the present invention, except in so far as they enter into combination with the control and actuating mechanisms hereinafter to be described.

Referring more particularly to the control and actuating mechanisms forming a part of the present invention, there is provided a self-contained control and actuating unit comprising a housing 36 mounted within the base 10, the various pumps of the unit, as hereinafter described, being powered from an electric motor 38. Referring to Figs. 4, 8 and 9, and the hydraulic diagram, Fig. 26, it will be seen that the hydraulic control and actuating mechanism comprises in general a pair of twin feed pumps 40 and 42 for imparting feeding movements to the actuators 24 and 26; a traverse pump 44 for imparting rapid traverse movements to the actuators and for supplying the general fluid pressure in the system; a feed rate control pump 46 for controlling the feeding speed of the feed pumps 40 and 42; a gas and liquid filled accumulator 48 employed to to impart the welding impact to the actuators 24 and 26 to effect the welding operation; and a pump 50 for charging the accumulator. The hydraulic control mechanism further includes a main reversing or multiflow valve 52, Fig. 2, carried on the upper bed surface of the main machine frame; an upset valve 54 cooperable with the accumulator as hereinafter described; a feed rate actuator 56 for controlling the feed speed of feed pumps 40 and 42 responsive to the operation of the feed rate control pump 46; and a volume control valve 58 for controlling the operation of the actuator 56. With the exception of the main reversing valve 52, the several pumps and control valves are all mounted on or carried within the casing 36, which also includes the various pipe connections and fluid reservoir, not shown, providing a self-contained hydraulic control structure for the welding machine.

The physical structures of the several pumps and valves will now be described, after which a detailed statement of the operation of the structure will be given, in reference to the hydraulic diagram, Fig. 26, at which time the various other elements shown in said diagram will also be identified and described.

The twin feed pumps 40 and 42 are illustrated in detail in Figs. 10 and 11. These feed pumps are preferably of the type and structure illustrated in my Patent No. 2,266,829, dated December 23, 1941, and more particularly as shown in Figs. 28–31 of said patent. As herein shown the pumps are powered from a drive shaft 60, Fig. 10, driven by the motor 38, said drive shaft being supported for rotation by a pair of antifriction bearings 62 and 64. The shaft is provided with a pair of eccentrically formed surfaces 66 and 68 each of which carries an antifriction bearing 70, the arrangement thus being such that the bearings are moved in an orbital path as the shaft 60 is rotatably driven. The outer races of the bearings 70 engage and impart oscillatory motion to a series of pivoted fingers 72, provided in both pumps, which fingers in turn engage and impart reciprocatory motion to a series of pump plungers 74, there being five fingers and associated pistons or plungers in each of the twin pump structures in the particular embodiment shown. Suitable valve mechanism, as disclosed in said Patent No. 2,266,829, is provided in association with the piston members so that the reciprocatory motion thereof may be employed to impart unidirectional pumping pressure to associated fluid conduits, oil preferably being employed as the pumped fluid in the embodiment shown.

Each pump structure further includes a rotatable plate 76, corresponding to plate 468, Fig. 30, in said patent. These plates carry a series of abutment stops 78, one for each finger, the stops having rounded upper surfaces so that as the plates 76 are rotatably adjusted the stops will intercept the radially inward motion of the fingers a greater or lesser amount, whereby to adjustably control the range of motion of the pumping pistons 74; and to thereby correspondingly adjust the volumetric pumping displacement of the pumps.

The adjustable rotative motion is imparted to the plates 76 by means of a pair of shafts 80 and 82, Fig. 10, these shafts carrying toothed sectors 84 in geared engagement with the toothed peripheral surfaces of the plates 76. Bevel gearing as indicated at 86 is provided so that the shafts 80 and 82 are geared together at all times for corresponding movement in opposite directions.

The means for adjustably positioning the shaft 80, to thereby adjust and control the volumetric displacement of the feed pumps 40 and 42 comprises the feed rate control pump 46, the feed rate actuator 56, and its associated volume control valve 58. Referring first to the feed rate control pump 46, the details thereof are illustrated in Figs. 14 and 15. The pump structure 46 is generally similar to the pump of my prior application, Serial No. 418,576, filed November 10, 1941, now Patent No. 2,494,841, dated January 17, 1950, and more particularly as shown in Figs. 19–21 thereof. As herein disclosed it will be seen that the drive shaft 60 carries an eccentric portion 88 which on rotation of the shaft imparts oscillatory motion to a pair of pivotally mounted bell-cranks as shown at 90 and 92. One arm of each of these bell-cranks underlies one of the two pump pistons 94 so that upon oscillatory motion of the bell-cranks a corresponding reciprocatory motion is imparted to the pump plungers to effect the pumping action as in the case of the feed pump structures previously described. Means is provided for adjustably limiting the motion of the bell-cranks, comprising a stop cam 96 carried at the lower end of a rotatable adjustment shaft 98, the arrangement being such that as shaft 98 is rotated cam 96 is correspondingly adjusted to limit the motion of the bell-cranks a greater or lesser amount, to thereby adjust the volumetric pump displacement.

The means for adjusting the shaft 98 is best shown in Figs. 4 and 9. It will be seen that the upper end of shaft 98 carries a bevel gear 100 adapted for engagement with a bevel gear 102 carried at one end of an elongated shaft 104, the opposite end of which carries a control knob 106 which may be manually adjusted to position the shaft 104, and resultingly to position the pump displacement control shaft 98, previously described. By this means it will be seen that the displacement of the feed rate control pump 46 may be readily manually adjusted and controlled by the operator, by manipulation of handle 106.

The fluid pumped by the feed rate control pump 46 is transmitted to the feed rate actuator 56 under control of the volume control valve 58. The structure of the feed rate actuator is shown in Figs. 4, 5, 6 and 9. Referring to Fig. 6, it will be seen that the actuator comprises a cylinder 108 within which is mounted a double headed piston comprising two heads or pistons 110 and 112 interconnected by means of a piston rod 114. The toothed central portion of rod 114 has geared engagement with a toothed sector 116 secured to a shaft 118 which shaft extends rearwardly, as shown in Fig. 9, and interconnects with the feed pump adjustment shaft 80 previously described. It will accordingly be seen that as the feed rate actuator 56 is operated, responsive to the pumping action of the feed rate control pump 46, adjustment and control of the feeding rate of the feed pumps 40 and 42 is effected through the connections described.

Shaft 118 extends forwardly through the front wall of the casing 36 and is provided at its forward end with a pointer 120, Fig. 4, cooperable with a dial 122, and operable between a pair of adjustable stop pins 124 and 126. By adjustably positioning the stop pins within the dial slot 128 the limits of travel of the shaft 118 may be predetermined, to thereby limit the range of volumetric adjustment of the feed pumps 40 and 42, as previously described.

The feed rate actuator cylinder 108, Fig. 6, communicates at one end with a pipe 130 and at its opposite end with a pipe 132 so as to effect the shifting of the pistons 110—112 in opposite directions. As will hereinafter be more particularly described, pipe 130 communicates with the traverse pump 44 which is continuously in operation when the machine is in service. The continuous pressure of the fluid within the pipe 130 thus normally maintains the pistons 110—112 at one limit of their travel, to the right as seen in Fig. 6, which imparts a minimum volumetric displacement to the feed pumps 40 and 42. Fluid at higher pressure is introduced into the feed rate actuator cylinder through pipe 132 from the feed rate control pump 46, when it is desired to shift the pistons 110—112 in the opposite direction and increase the feed pump displacement, under control of the volume control valve 58 now to be described.

The volume control valve is illustrated in Figs. 23 and 24 and comprises a casing or housing 134 having a valve plunger 136 longitudinally shiftable therein. An inlet pipe or conduit leads from the feed rate control pump 46 as indicated by the numeral 138. The conduit leading to the feed rate actuator is shown at 132, and there is an exhaust or drain return to the reservoir as indicated at 140. A compression spring 142 normally holds the valve in its rightward position as shown, wherein the actuator conduiit 132 and drain line 140 are interconnected and conduit 138 from the feed rate control pump 46 is closed to conduit 132 by the valve so that the pistons of the actuator are held in the rightward limit position as seen in Fig. 6 by the normal traverse pump pressure as previously described.

A solenoid is provided as indicated at 144 having an armature 146 operable upon a rocker arm 148, the lower end of the arm being interconnected with and arranged to actuate the valve plunger. Energization of the solenoid thrusts the armature 146 to the right as seen in Fig. 23, thereby actuating the valve plunger leftwardly to cut off the drain line 140, and interconnect the actuator line 132 with the supply line 138 leading from the feed rate control pump, so as to actuate the feed rate actuator pistons 110—112 in the opposite direction as previously described. Immediately upon deenergization of the solenoid the compression spring 142 operates to return the valve plunger to its normal rightward position and actuator pistons 110—112 are shifted to the right in Fig. 6 by the normal traverse pump pressure.

By reason of the described connections it will be seen that upon operation of the volume control valve 58 the feed rate actuator 56 will be caused to function to increase the feed rate of the feed pumps 40 and 42, from a normal predetermined minimum, the acceleration or rate of such increase being determined by the characteristic of the adjustment of the feed pumps as actuated by the volumetric delivery of the feed rate control pump 46, the delivery of which is in turn adjustably controlled by the control knob 106.

The accumulator 48, previously mentioned, is employed to impart an impact, or high volumetric delivery of fluid to the actuators 24—26, at a predetermined time to effect the welding operation. The accumulator is charged by means of the charging pump 50, and its functioning is controlled by means of the upset valve 54. The accumulator reservoir 48 may be of any suitable design, and is disposed within the casing 36 as previously indicated in reference to Fig. 9. The accumulator is charged with gas which is compressed by the liquid oil which is delivered under pressure to the accumulator chamber, the line of demarcation between the oil and the compressed gas being diagrammatically indicated at 150 in Fig. 26.

The accumulator charging pump 50 is shown in Figs. 14 and 16. Its structure is essentially similar to the feed pumps 40 and 42 previously described and comprises a bearing 152 for the central drive shaft, and an eccentric portion 154 formed on the shaft upon which is mounted an antifriction bearing 156. The outer race of this bearing engages a series of pivoted fingers 158 which in turn engage and actuate the reciprocating pumping pistons or plungers 160. Suitable valve means is provided, as shown in my said prior Patent No. 2,266,829 so that the reciprocative movements of the pumping pistons impart unidirectional flow of the pumped oil to the accumulator 48 as the pump is actuated.

The upset valve structure 54 is shown in Figs. 12 and 13. It will be seen that the valve comprises a casing 162 having a shiftable valve plunger 164 therein. The inlet valve port 166 interconnecting with inlet conduit 168 is always in communication with conduit 170 leading to the accumulator. When the valve is in the position shown in Fig. 12 the conduit 172 leading from the main reversing or multiflow valve 52 as will be presently described, is in communication with a conduit 174 leading to the actuator cylinders 24 and 26. The valve plunger 164 is normally held in the position of Fig. 12, to the left as seen therein, by means of a compression spring 176 which bears against the valve at one end.

The valve structure includes a solenoid 178, Fig. 13, having an armature 180 arranged to actuate a rocker 182 which in turn operates the valve plunger 184 of a pilot valve 186, against the action of a return spring 187. Normally the pilot valve plunger 184 is in a position such that the valve conduit 188 which is in communication with the upset valve plunger 164 at one end, is connected to a drain port or line 190. Upon actuation of solenoid 178 the pilot valve plunger is actuated so that a pressure port 192 which communicates with pressure line 194 is placed in communication with the conduit 188, and the drain conduit 190 shut off, whereby to effect the hydraulic shifting of the valve plunger 164 of the upset valve against the action of the spring 176, and to the right as seen in Fig. 12. A drain port 196 insures the free movement of the valve plunger under such hydraulic actuation. With the upset valve plunger 164 in its rightward shifted position flow through conduit 172 leading from the main reversing valve 52 is cut off, and at the same time the conduits 170 and 174 are interconnected so that a large volume of oil may be ejected by the compressed gas of the accumulator, from the accumulator and through the upset valve to the actuators to effect the upset forging operation.

The structure of the traverse pump 44 is illustrated in Figs. 14 and 17. This traverse pump may preferably be of the type shown in my copending application, Serial No. 622,397, filed October 15, 1945, now Patent No. 2,588,430, dated March 11, 1952. As illustrated it comprises a rotor 198 splined to and thus drivingly connected with the main drive shaft 60. This rotor carries a series of blades 200 arranged on rotation of the rotor to propel fluid from the inlet ports 201 of an annular inlet channel 202 communicating with an inlet pipe 204 to the outlet ports 205 of an annular exhaust channel 206 communicating with an exhaust pipe 208. The blades are pressure urged outwardly into engagement with a cam track 210 formed as a part of the fixed housing structure, so that the blades are reciprocated within the rotor slots in which they are mounted, and so as to effect the pumping action in a manner characteristic of rotary vane pumps. The traverse pump 44 is of relatively larger volume and lower delivery pressure than the plunger pumps 40, 42 and 50 previously described.

The main reversing or multiflow valve 52 is illustrated in Figs. 18–22. The valve comprises a casing 212 within which there is mounted a traverse valve plunger 214 and a feed valve plunger 216. The traverse plunger cooperates with an inlet conduit 218 in a manner so as to direct fluid therefrom either to a port 220 connecting with the conduit 172 leading to the upset valve, or to a port 222 connecting with a conduit 224 leading to the actuator cylinders 24—26. Normally, when the valve plunger 214 is in neutral position, as shown in Fig. 18, fluid from the inlet conduit 218 is blocked off. Fluid is delivered to the port 220 when the valve is shifted fully to the right, and to the port 222 when the valve is shifted fully to the left, from the neutral position shown. When fluid is directed from the inlet conduit 218 to port 220, return fluid returning to the valve through port 222 enters chamber 226 from which it passes through ports 228 and 230 to a drain line as indicated at 232. Similarly when fluid is directed from inlet conduit 218 to port 222, return fluid from port 220 flows to drain passage 234 and thence to the drain line 232.

The feed valve plunger 216 is similarly arranged so as to normally block its inlet conduit 236 when in normal position, or direct fluid therefrom to a port 238 connecting with port 220, when the valve plunger is shifted rightwardly, or to a port 240 connecting with port 222, when the plunger is shifted leftwardly from the neutral position shown. Return fluid from port 240 enters chamber 242 connecting with exhaust port 230, whereas return fluid from port 238 enters chamber 244 interconnecting with exhaust port 234. The traverse plunger 214 and feed plunger 216 are mechanically interconnected for movement together, and the arrangement is such that the feed plunger uncovers the port 238 or the port 240, as the case may be, before the traverse plunger uncovers either the port 220 or the port 222, so that the plungers may be shifted in either direction partially to a feeding position, or fully to a traverse position, as will be understood. When the valve is shifted fully to its traverse positions, the feed plunger 216 is shifted sufficiently so that fluid from the feed inlet 236 is blocked off.

The valve plungers may be mechanically shifted by means of a control handle 246 as shown in Figs. 20-22. More particularly, this control handle is secured to a shaft 248 which carries an arm 250 mechanically interconnecting with the feed valve plunger 216, and an arm 252 mechanically interconnecting with the traverse valve plunger 214, so that as the handle 246 is manipulated the valve plungers will be correspondingly shifted.

The valve plungers may also be hydraulically shifted by solenoid control. A forward solenoid 254 and accompanying pilot valve 256 are disposed at one end of the reverse valve structure, the solenoid having an armature 258, Fig. 19, operable upon a rocker 260 so as to operate the valve stem 262 of the pilot valve structure against the action of a return spring 261. The arrangement is such that normally the pilot valve stem 262 is in a position so as to interconnect the reverse valve chamber 264 with drain port 266 and associated drain line 268. Upon operation of the solenoid the pilot valve is shifted so as to interconnect chamber 264 with a port 270 interconnected with pressure line 272 in a manner so as to shift a piston plunger 274 to the right as seen in Fig. 18, to move the traverse and feed valves 214 and 216 to their extreme rightward or forward traverse position. The spring 261 returns the pilot valve to drain position upon deenergization of the solenoid, but the solenoid is sufficiently slow in releasing to insure complete shifting of the valve plungers even if the solenoid has only been momentarily energized.

In a similar manner the opposite end of the valve 52 carries a reverse solenoid 276 and an associated pilot valve 278 operable normally to interconnect valve chamber 280 with drain port 282, and upon actuation of the solenoid to interconnect the chamber with pressure port 284 so as to operate plunger 286 to shift the traverse and feed valves 214 and 216 to their extreme leftward or reverse position. The pilot valve is shifted against the action of spring 287, but the solenoid is sufficiently slow release to insure a complete valve shift to reverse position before the spring restores the pilot valve plunger to its drain position.

A dog bar 288, Figs. 1, 2 and 18, is secured to the work support 14, this bar carrying a series of adjustable dogs as indicated at 290, 292, 294, 296 and 297 cooperable with the valve and with a series of limit switches as indicated at 298, 300 and 301, to effect the automatic machine control. More particularly, dog 290 cooperates with a cam 302, Fig. 18, mounted on shaft 248 and operates to shift the valve plungers 214 and 216 to a neutral or stop position. Dog 292 cooperates with cam 304 on shaft 248 to shift the valve plungers to a feeding position, as will be presently described. Dog 294 cooperates with limit switch 298 to operate the solenoid of the volume control valve 58, and dog 296 cooperates with limit switch 300 to actuate the solenoid 170 of the upset valve 54 and the forward solenoid 254 of the multiflow valve 52, as also will more particularly hereinafter appear. Dog 297 cooperates with limit switch 301 to control the application of the welding current.

*Control circuit and operation*

Referring to the hydraulic diagram, Fig. 26, the control mechanism includes, in addition to the valves and pumps previously described, four adjustable relief valves as indicated at 306, 308, 310 and 312, which may be of any suitable structure; a check valve 314 for preventing reverse flow from the accumulator to the accumulator charging pump 50; and an adjustable orifice device 316 which preferably comprises an adjustable orifice control member 318 for adjustably metering fluid flow through the orifice device.

In operation, referring to the electrical and hydraulic diagrams, Figs. 25 and 26, to start the machine the operator closes a push button switch 320, Figs. 2 and 25, which energizes and starts the drive motor 38, said motor and the several pumps actuated thereby remaining in continuous operation during the service of the machine. To maintain the motor energized the start push button energizes a relay 322 closing a switch 324 to maintain a holding circuit for the motor after the start push button has been released. Thereupon the motor will be maintained in operation until actuation of the stop push button switch 326. In the electric circuit diagram motor circuit relays, overload relays, and like conventional electrical devices have been omitted for simplicity of illustration, as will be understood.

Operation of the traverse pump 44 draws oil from the reservoir through a filter 328, Fig. 26, and propels it through an outlet line 330 having branches 332, 334, 336 and 338 leading to the several plunger pumps for charging purposes. The balance of the flow from the conduit 330 passes through the orifice device 316 to line 340, and thence outwardly through by-pass line 342 through the relief valve 312 at the pressure setting thereof, inasmuch as fluid flow from conduit 340 through the multiflow valve 52 is blocked when the valve is in its normal neutral position.

The outlet conduit 344 from the accumulator charging pump 50 leads through the check valve 314 to the inlet conduit 168 of the upset valve 54, and when this valve is in its normal position of Fig. 12 the fluid passes through the valve to the accumulator through line 170 as previously described. If and when the accumulator becomes fully charged the relief valve 308 opens, the valve being connected to the pump outlet through a conduit 368 as shown. The setting of relief valve 308 thus determines the maximum charging pressure of the accumulator structure. The check valve 314 prevents reverse flow to the accumulator charging pump from the accumulator, at all times.

During operation of the pumps, prior to actuation of the multiflow valve, the output from the feed rate control pump 46 is diverted through line 348 to the relief valve 308, and the output from the feed pumps 40 and 42 is diverted through lines 350 and 352 which are connected in parallel to the line 354 leading to the relief valve 310.

To effect an automatic cycle of operation of the machine the work pieces are mounted in position and push button switch 356, Fig. 25, operated to energize solenoid 358 to close the clamps 28 and 30. As previously pointed out, the clamp structures may be of any suitable structure, preferably operable by suitable independent hydraulic circuits under electrical control. Push button 364 is then operated to energize the forward magnet 254 of the multiflow valve and shift the valve plungers 214 and 216 thereof to forward approach position. Fluid is thereupon directed through the valve inlet line 218 from the traverse pump 44, through the multiflow valve, through line 172 leading to the upset valve, through the upset valve and thence through line 174 to the actuators. Return fluid from the actuators is transmitted through line 224 back to the multiflow valve through which it passes to the exhaust line 232 as previously described, for discharge back to the reservoir. In the traverse position of the valve, the feed plunger 216 is shifted sufficiently to block feed inlet 236 so that fluid from the feed pumps 40 and 42 remains blocked off. An approach traverse movement is thus imparted to the actuators to advance the work support 14 at traverse speed determined by the setting of the orifice device 316. The orifice device insures the maintenance of sufficient pressure in line 330, during traverse, for pump charging and valve pilot control purposes, as previously described.

At a predetermined point near the end of the traverse movement dog 297 engages limit switch 301 to thereby actuate a solenoid 363, Fig. 25, to apply the welding potential from one or more welding transformers as shown at 365, Fig. 1. The details of such transformers, or of the current applying members 31, form no part of the invention, as previously brought out.

As the work pieces are brought into proximity feed dog 292, Fig. 2, operates to mechanically shift the multiflow valve to its feeding position wherein fluid flow from the traverse inlet 218 to the valve is cut off but feeding flow through the inlet conduit 236 from the feed pumps is established. At this time the feed pumps 40 and 42 are pumping at a predetermined minimum feed rate, flow through conduit 132 to the feed rate actuator 56 having been up to this point cut off in the normal position of the volume control valve 58; the feed rate actuator pistons thus having been maintained in their minimum feed rate position by fluid directed to the feed rate actuator from the traverse pump through the conduit 130.

At a predetermined point in the feed approach of the work supports dog 294 actuates limit switch 298 which thereby energizes solenoid 144 of the volume control valve. Fluid is thereupon directed by the valve from the feed rate control pump 46 through conduit 138, through the valve, and through conduit 132 to the feed rate actuator, to thereby shift the actuator and adjust and control the volumetric displacement of the feed pumps 40 and 42 in accordance with their adjustment characteristics as operated by the feed rate control pump 46 and the adjusted pumping rate thereof, said adjustment being manually determined by the setting of control knob 106 as previously described. A progressively increasing feeding rate of the work support 14 results.

At a further predetermined point, as the work pieces are brought substantially into abutment, and after the "burning off" and "heating" of the work pieces has occurred, control dog 296 actuates limit switch 300 which limit switch thereupon simultaneously energizes the operating solenoid 178 of the upset valve and the forward solenoid 254 of the multiflow valve. The shifting of the upset valve 54 causes fluid to be transmitted from the accumulator through conduit 170, through the upset valve, and through conduit 174 to the actuators 24 and 26 to impart thereto a high speed forward movement or "impact" to effect and complete the welding operation, the actuators moving against adjustable fixed stops or other suitable limiting means as indicated at 367, Fig. 26. The return fluid from the actuators during such impact movement passes to the multiflow valve through conduit 224, and flows through the valve to exhaust line 232 in an unrestricted manner inasmuch as the valve has been shifted to its forward position by operation of the forward solenoid 254.

The closing of limit switch 300 also energizes a slow acting or timer relay 366, Fig. 25, the speed of operation of which is adjustable and which upon operation deenergizes solenoid 254 of the multiflow valve and solenoid 178 of the upset valve, the upset valve thereupon returning to normal position. The operation of the timer relay 366 also simultaneously energizes a solenoid 368 which cuts off the welding current, a solenoid 370 which releases the clamp 30, and the reverse solenoid 276 of the multiflow valve which thereupon operates to shift the multiflow valve to its rapid traverse reverse position. In this position of the multiflow valve traverse fluid from the line 218 passes through the valve to line 224 leading to the actuators to effect the reverse movement thereof. The return fluid from the actuators passes through conduit 174 to the upset valve 54 which, having returned to normal position, transmits such fluid through conduit 172 back to the multiflow valve through which it passes to exhaust line 232. The action of the timer 366 can be duplicated by the manipulation of a manual reverse push button as shown at 372, if desired.

As the work support 14 is retracted, limit switch 298 is released and the volume control valve 58 returns to normal position. Limit switch 300 is also released which deenergizes the timer relay which on dropping out deenergizes the reverse coil of the multiflow valve.

As the work support reaches home position stop dog 290 mechanically returns the multiflow valve to its neutral position, and the cycle of operation is complete.

By manipulation of the manual control handle 246 of the multiflow valve, traverse and feeding movements in either forward or reverse direction may be selectively imparted to the actuators, for setup operations. A manual push button 374, Fig. 25, is provided for selectively disabling the action of the timer relay 366, during such manual setup operations, so as to prevent the inadvertent release of clamp 30. Similarly manual push buttons may be provided as indicated at 373, 375, and 377 for disabling the various limit switches as may be desired.

The foregoing cycles of operation will be more particularly understood by reference to the cycle diagrams, Fig. 3, wherein velocity, as ordinate, is plotted against travel, as abscissa. In Diagram I a manual approach movement is indicated illustrating how the forward feeding rate may be progressively decreased by manual manipulation of the multiflow valve 52 as the work parts are brought into abutting engagement for setup purposes. Diagram II indicates the rapid return travel.

Diagram III indicates the movement of the work pieces toward each other in the automatic welding cycle previously described. It will be seen that the rapid traverse approach movement drops to a predetermined minimum feed rate, as indicated at 376, as the multiflow valve is shifted to feeding position. Feeding then progresses at a uniform minimum rate to a point indicated by the numeral 378, at which time the volume control valve operates to progressively increase the feeding speed of the feed pumps 40 and 42. The feeding rate is thereupon progressively increased in an "arcuate" manner to a point as indicated at 380 at which time the upset valve 54 operates to impart a high speed or "impact" forward movement to the work pieces to complete the weld. This movement may be very rapid, as indicated by the broken line 381. The limiting position of the work pieces, as the stop 367 is engaged, is indicated by the terminal line 382 at which point the forward speed drops to zero. The rapid return movement is indicated in Diagram IV.

It will be seen that the machine provides for the accurate control of the work piece movements during the welding operation, and furthermore provides readily operable means by which the various stages of movement can be readily varied to accommodate variations in operating conditions such, for example, as variations in size of work pieces, the metal constituency thereof, et cetera. More specifically, the invention provides automatic control and actuation which brings the work pieces into juxtaposition at a rapid rate, and then moves them further toward each other at a feeding rate with the welding potential applied. This feeding rate is progressively increased in an "arcuate" manner, at a rate of acceleration which can be accurately controlled, whereby to effect a proper "burning off" and "heating" of the work pieces. At an accurately predetermined position and time a high speed "impact" movement is imparted to the work pieces to complete and effect the weld.

Various changes may be made in the specific embodiment set forth without departing from the spirit of the invention. The invention is accordingly not to be limited to the particular structures shown and described, but only as indicated in the following claims.

The invention is hereby claimed as follows:

1. A resistance welding machine comprising supports for a plurality of work pieces to be welded, means for applying welding potential to the work pieces, and means for shifting the supports relative to each other to bring the work pieces together with the welding potential applied, said shifting means including approach traverse means, separate approach feeding means, return traverse means, and power control means adapted automatically to operate said traverse means, feeding means, and return traverse means in predetermined sequence.

2. A resistance welding machine comprising supports for a plurality of work pieces to be welded, means for applying welding potential to the work pieces, and means for shifting the supports relative to each other to bring the work pieces together with the welding potential applied, said shifting means including power approach traverse means, power approach feeding means, power return traverse means, automatic power control means adapted to operate said traverse and feed means in predetermined sequence, and power means adapted progressively to increase the speed of operation of the approach feeding means as the work pieces approach welding relation.

3. A resistance welding machine comprising supports for a plurality of work pieces to be welded, means for applying welding potential to the work pieces, and power hydraulic means for shifting the supports relative to each other to bring the work pieces together with the welding potential applied, including pumping means, actuator means, automatic power control means for effecting the movement of the actuator means at approach traverse, approach feed, and return traverse in sequence, and power means adapted progressively to change the rate of movement of the actuator means during approach feed.

4. A resistance welding machine comprising supports for a plurality of work pieces to be welded, means for applying welding potential to the work pieces, and power means for shifting the supports relative to each other to bring the work pieces together with the welding potential applied, said shifting means including power approach traverse means, separate power approach feeding means, power return traverse means, power control means effecting the operation of said traverse and feeding means in predetermined sequence, and separate power means for imparting rapid movement to the work supports relative to each other at a predetermined point in the operation of the approach feeding means.

5. A resistance welding machine comprising supports for a plurality of work pieces to be welded, means for applying welding potential to the work pieces, and power means for shifting the supports relative to each other to bring the work pieces together with the welding potential applied, said shifting means including approach traverse means, approach feeding means, power means for progressively changing the speed of operation of the approach feeding means, impact means, return traverse means, and power control means adapted to operate said traverse, feeding, and impact means in predetermined sequence.

6. A resistance welding machine comprising supports for a plurality of work pieces to be welded, means for applying welding potential to the work pieces, and power hydraulic means for shifting the supports relative to each other to bring the work pieces together with the welding potential applied, including pumping means, actuator means, and automatic control valve means adapted to effect the movement of the actuator means at approach traverse, return traverse, a progressively varying feeding approach, and an impacting rate in a predetermined sequence.

7. A resistance welding machine comprising supports for a plurality of work pieces to be welded, means for applying welding potential to the work pieces, and power hydraulic means for shifting the supports relative to each other to bring the work pieces together with the welding potential applied, including actuator means, a variable displacement feeding pump for shifting the actuator means, and a pump for varying the displacement of said feeding pump.

8. A resistance welding machine comprising supports for a plurality of work pieces to be welded, means for applying welding potential to the work pieces, and power hydraulic means for shifting the supports relative to each other to bring the work pieces together with the welding potential applied, including actuator means, a variable displacement feeding pump for shifting the actuator means, a pump for controlling the displacement of the feeding pump, and means for varying the pumping rate of said last named pump to thereby vary the acceleration rate of the feeding pump displacement.

9. A resistance welding machine comprising supports for a plurality of work pieces to be welded, means for applying welding potential to the work pieces, and power hydraulic means for shifting the supports relative to each other to bring the work pieces together with the welding potential applied, including actuator means, an accumulator, a feeding pump, means for varying the pumping rate of the feeding pump, a traverse pump, and control valve means adapted selectively to interconnect the actuator means with the accumulator and with said feeding and traverse pumps to effect traverse, feed, and impact movements thereof.

10. A resistance welding machine comprising supports for a plurality of work pieces to be welded, means for applying welding potential to the work pieces, and means for shifting the supports relative to each other to bring the work pieces together with the welding potential applied, said shifting means including traverse pumping means, approach feed pumping means, said feed pumping means being independent of said traverse means, and power control valve means, said valve means being adapted to effect the operation of said traverse and feed pumping means in predetermined sequence.

11. A resistance welding machine comprising supports for a plurality of work pieces to be welded, means for applying welding potential to the work pieces, and power hydraulic means for shifting the supports relative to each other to bring the work pieces together with the welding potential applied, including actuator means, traverse pumping means, feed pumping means, and control means adapted to connect said traverse and feed pumping means to said actuator means in predetermined sequence.

12. A resistance welding machine comprising supports for a plurality of work pieces to be welded, means for applying welding potential to the work pieces, and power hydraulic means for shifting the supports relative to each other to bring the work pieces together with the welding potential applied, including actuator means, traverse pumping means, separate feed pumping means, and separate hydraulic power means for imparting an impact movement to said actuator means, said pumping means and power means being adapted to be connected to said actuator means in predetermined sequence.

13. A resistance welding machine comprising supports for a plurality of work pieces to be welded, means for applying potential to the work pieces, and power hydraulic means for shifting the supports relative to each other to bring the work pieces together with the welding potential applied, including actuator means, traverse pumping means, feed pumping means, hydraulic power means for imparting an impact movement to the actuator means, and control means for connecting said pumping means and impact imparting means to said actuator means in predetermined sequence.

14. A resistance welding machine comprising supports for a plurality of work pieces to be welded, means for applying welding potential to the work pieces, and power hydraulic means for shifting the supports relative to each other to bring the work pieces together with the welding potential applied, including actuator means, a traverse pump, a feed pump, an accumulator, and control means adapted to connect said traverse and feed pumps and accumulator to said actuator means in predetermined sequence.

15. A resistance welding machine comprising supports for a plurality of work pieces to be welded, means for applying welding potential to the work pieces, and power hydraulic means for shifting the supports relative to each other to bring the work pieces together with the welding potential applied, including actuator means, a feed pump, an accumulator, and control means for connecting said pump and said accumulator to said actuator means in a predetermined sequence.

16. A hydraulic actuating and control circuit including actuator means, traverse pumping means, feed pumping means, power control means for continuously and progressively increasing the pumping rate of said feed pumping means in a controlled and predetermined manner, and control means for connecting said traverse and feed pumping means to said actuator means in predetermined sequence, said control means connecting the output of only one of said pumping means to the actuator at any time.

17. A hydraulic actuating and control circuit including actuator means, traverse pumping means, variable displacement feed pumping means, a pump for varying the displacement of said feed pumping means, said pump and feed pumping means being connected in a functionally closed circuit, and control means for connecting said traverse and feed pumping means to said actuator means in predetermined sequence.

18. A resistance welding machine comprising supports for a plurality of work pieces to be welded, means for applying welding potential to the work pieces, and means for shifting the supports relatively to each other to bring the work pieces together with the welding potential applied, said shifting means including power approach traverse means, power approach feeding means, and power control means adapted progressively to increase the speed of operation of the approach feeding means as the work pieces approach welding relation.

19. A resistance welding machine comprising supports for a plurality of work pieces to be welded, means for applying welding potential to the work pieces, and means for shifting the supports relative to each other to bring the work pieces together with the welding potential applied, said shifting means including power approach traverse means, power approach feeding means, and power means adapted to operate said feeding means at an increasingly accelerating rate as the work pieces approach contracting juxtaposition.

20. A resistance welding machine comprising supports for a plurality of work pieces to be welded, means for applying welding potential to the work pieces, means for shifting said supports relative to each other to bring the work pieces together with the welding potential applied, said shifting means including power impact means for imparting an impacting movement to the work pieces as the work pieces approach contacting juxtaposition whereby to effect welding of said work pieces, timing means to hold said work pieces in the impacted position for a predetermined time, and means to remove the welding potential from the work pieces at the end of said predetermined time.

21. A hydraulic actuating and control circuit including actuator means, traverse pumping means, continuously variable capacity feed pumping means, an accumulator, and power control means for connecting said pumping means and accumulator to said actuator means in predetermined sequence, said power control means connecting the output of only one of said pumping means to the actuator at any one time.

22. A hydraulic actuating and control circuit including actuating means, traverse pumping means, feed pumping means, an accumulator, power control means for continuously and progressively increasing the pumping rate of said feed pumping means, and power control means for connecting said pumping means and accumulator to said actuator means in predetermined sequence, said power control means connecting the output of only one of said pumping means to the actuator at any time.

23. A hydraulic actuating and control circuit including actuator means, traverse pumping means, variable displacement feed pumping means, a pump for varying the displacement of said feed pumping means, and control means for connecting said traverse pumping means and feed pumping means to said actuator means in predetermined sequence, said control means connecting the output of only one of said pumping means to the actuator means at any time.

24. A resistance welding machine comprising supports for a plurality of work pieces to be welded, means for applying welding potential to the work pieces, and means for shifting the supports relatively to each other to bring the work pieces together with the welding potential applied, said shifting means including power approach feeding means, and power control means adapted to operate said feeding means at an increasingly accelerating rate as the work pieces approach contacting juxtaposition.

25. A resistance welding machine comprising supports for a plurality of work pieces to be welded, means for applying welding potential to the work pieces, and means for shifting the supports relatively to each other to bring the work pieces together with the welding potential applied, said shifting means including power approach feeding means, power means adapted to operate said feeding means at an increasingly accelerating rate as the work pieces approach contacting juxtaposition, impacting means for imparting an impacting movement to the work pieces to effect a weld, and timing means to hold said work pieces in the impacted position for a predetermined time.

26. The method of effecting the resistance welding of work pieces which includes mounting the work pieces to be welded upon a plurality of work piece supports, applying welding potential to the work pieces, shifting the work pieces relatively toward each other in a controlled pattern of movement including a rapid traverse approach and a reduced feed approach velocity followed by an increasing velocity acceleration relative to the feed approach velocity as the work pieces approach contacting juxtaposition, and thereafter impacting the work pieces together with the welding potential applied.

27. The method of welding as defined in claim 26, wherein the welding potential is terminated at a predetermined time after impact.

ERNEST J. SVENSON.

References Cited in the file of this patent

UNITED STATES PATENTS

| Number | Name | Date |
|---|---|---|
| 535,293 | Leitch | Mar. 5, 1895 |
| 780,614 | Nash | Jan. 24, 1905 |
| 1,434,285 | Gale | Oct. 31, 1922 |
| 1,522,195 | Lemp | Jan. 6, 1925 |
| 1,676,282 | Phelps | July 10, 1928 |
| 1,892,208 | Ferris et al. | Dec. 27, 1932 |
| 1,896,052 | Ferris | Jan. 31, 1933 |
| 1,957,759 | Coates et al. | May 8, 1934 |
| 1,982,711 | Vickers | Dec. 4, 1934 |
| 1,984,988 | Ranpach et al. | Dec. 18, 1934 |
| 1,996,466 | Ernst | Apr. 2, 1935 |
| 2,002,007 | Hanson | May 21, 1935 |
| 2,042,247 | Blood | May 26, 1936 |
| 2,051,052 | Morgan | Aug. 18, 1936 |
| 2,192,778 | Stacy | Mar. 5, 1940 |
| 2,280,190 | Ernst | Apr. 21, 1942 |
| 2,295,813 | Tucker | Sept. 15, 1942 |
| 2,299,686 | Ernst | Oct. 20, 1942 |
| 2,302,922 | Tucker | Nov. 24, 1942 |
| 2,359,324 | Marcaux | Oct. 3, 1944 |
| 2,370,383 | Wallace et al. | Feb. 27, 1945 |
| 2,389,829 | Tyler | Nov. 27, 1945 |
| 2,392,471 | Fox | Jan. 8, 1946 |
| 2,481,317 | Lepine-Williams | Sept. 21, 1949 |

FOREIGN PATENTS

| Number | Country | Date |
|---|---|---|
| 280,659 | Great Britain | Nov. 24, 1927 |
| 364,357 | Great Britain | Jan. 7, 1932 |
| 564,210 | Great Britain | Sept. 18, 1944 |